(12) United States Patent
Van Der Lee et al.

(10) Patent No.: US 11,543,273 B2
(45) Date of Patent: Jan. 3, 2023

(54) METHOD AND APPARATUS FOR DETERMINING THE ABSOLUTE VALUE OF THE FLOW VELOCITY OF A PARTICLE-TRANSPORTING MEDIUM

(71) Applicants: Robert Bosch GmbH, Stuttgart (DE); Trumpf Photonic Components GmbH, Ulm (DE)

(72) Inventors: Alexander Van Der Lee, Venlo (NL); Robert Weiss, Waldbronn (DE); Hans Spruit, Waalre (NL)

(73) Assignees: Robert Bosch GmbH, Stuttgart (DE); Trumpf Photonic Components GmbH, Ulm (DE)

( * ) Notice: Subject to any disclaimer, the term of this patent is extended or adjusted under 35 U.S.C. 154(b) by 514 days.

(21) Appl. No.: 16/718,545

(22) Filed: Dec. 18, 2019

(65) Prior Publication Data
US 2020/0200577 A1    Jun. 25, 2020

(30) Foreign Application Priority Data
Dec. 20, 2018    (DE) .......................... 102018222590.7

(51) Int. Cl.
*G01F 1/661*    (2022.01)
*G01F 1/66*    (2022.01)

(52) U.S. Cl.
CPC .............. *G01F 1/661* (2013.01); *G01F 1/662* (2013.01)

(58) Field of Classification Search
CPC .................................. G01F 1/661; G01F 1/662
(Continued)

(56) References Cited

U.S. PATENT DOCUMENTS 4,373,807 A * 2/1983 Gouesbet ........... G01N 15/0205
356/28.5
4,838,687 A * 6/1989 Pfeifer ...................... G01P 5/26
356/28.5
(Continued)

FOREIGN PATENT DOCUMENTS

DE        35 18 800 A1    11/1986
DE        44 430 69 A1     6/1996
(Continued)

*Primary Examiner* — Nathaniel T Woodward
(74) *Attorney, Agent, or Firm* — Maginot, Moore & Beck LLP

(57) ABSTRACT

The invention relates to a method for determining the absolute value of the flow velocity (v) of a particle-transporting medium. At least two measurement laser beams (L_i) with linearly independent, non-orthogonal measurement directions (b_i) are emitted. The measurement laser beams (L_i) scattered at particles are detected and one measurement signal (m_i) is generated in each case for each measurement laser beam (L_i). The measurement signals (m_i) are evaluated, wherein absolute values of velocity components (v_i) are ascertained as projections of the flow velocity (v) on the respective measurement directions (b_i), wherein a solid angle region is ascertained for the prevalent direction of the flow velocity (v) and signs assigned to this solid angle region are chosen for the individual velocity components (v_i), and wherein the absolute value of the flow velocity (v) is determined using the ascertained absolute values of the velocity components (v_i) and using the chosen signs for the velocity components (v_i).

22 Claims, 7 Drawing Sheets

(58) Field of Classification Search
USPC .......................................................... 356/28.5
See application file for complete search history.

(56) References Cited

U.S. PATENT DOCUMENTS

| | | | | |
|---|---|---|---|---|
| 6,091,493 A * | 7/2000 | Stover | ................ | G01N 15/0205 |
| | | | | 702/29 |
| 2019/0285537 A1* | 9/2019 | Spruit | ................ | G01N 15/1434 |
| 2019/0285753 A1* | 9/2019 | Spruit | ................ | G01S 7/4916 |

FOREIGN PATENT DOCUMENTS

| | | |
|---|---|---|
| DE | 10 200 504 29 54 A1 | 3/2007 |
| WO | 2018104153 A1 | 6/2018 |
| WO | 2018104154 A1 | 6/2018 |

* cited by examiner

METHOD AND APPARATUS FOR DETERMINING THE ABSOLUTE VALUE OF THE FLOW VELOCITY OF A PARTICLE-TRANSPORTING MEDIUM

This application claims priority to German Application No. DE 102018222590.7 filed on Dec. 20, 2018. The entire contents of the above-mentioned German patent application is incorporated herein by reference as part of the disclosure of this U.S. application.

The present invention relates to a method for determining the absolute value of the flow velocity of a particle-transporting medium, and to a corresponding apparatus. Specifically, the invention relates to such an apparatus for use in a portable appliance, in particular in a smartphone, tablet, laptop or a wearable computer.

PRIOR ART

The measures according to the invention can be advantageously used for determining the measurement volume of a particle sensor apparatus.

Particle sensors are used, inter alia, for determining the particulate pollution in the ambient air. By way of example, the particulate pollution can be quantified by determining the particle number in a predetermined measurement volume, with particles with diameters below a predetermined dimension only being considered for accurate classification purposes. As a result, it is possible to distinguish for instance between coarse particles, fine particles and ultrafine particles. Such a measurement is particularly important for monitoring the emissions of industrial installations. The determination of the particulate pollution is also needed in the automotive sector in order to monitor the observance of predetermined limit values. In order to save weight and reduce the required installation space, there is a need for particle sensors with a design that is as compact as possible. Further, even private users are interested in independently measuring the local particulate pollution, for instance by using portable appliances such as smartphones, tablets, laptops or wearable computers.

The measurement methods used within the scope of particle sensors range from mechanical methods, for instance using filters disposed in stages, to optical methods. An exemplary optical particle sensor is known from WO 2017/198699 A1. The particle sensor comprises a laser sensor module comprising a plurality of lasers, which emit measurement laser beams that are reflected at the particles and detected by a detector in each case. The detection principle of the particle sensor is based on a self-mixing interference method (SMI method). In such methods, the reflected measurement laser beams interfere with the emitted measurement laser beams. The respectively detected signal is the result of this interference. The evaluation thereof allows conclusions to be drawn about the existence and properties of the particles in the surroundings of the particle sensor. A further exemplary optical particle sensor for detecting particle densities of small particles with particle dimensions in the range between 0.05 µm and 10 µm is known from WO 2018/104153 A1.

SUMMARY OF THE INVENTION

The invention relates to a method for determining the absolute value of the flow velocity of a particle-transporting medium, having the features of Patent Claim 1. The invention further relates to an apparatus for determining the absolute value of the flow velocity of a particle-transporting medium, having the features of Patent Claim 14.

Preferred embodiments are the subject matter of the respective dependent claims.

According to a first aspect, the invention accordingly relates to a method for determining the absolute value of the flow velocity of a particle-transporting medium, wherein at least two measurement laser beams with linearly independent, non-orthogonal measurement directions are emitted. The measurement laser beams scattered at particles are detected and one measurement signal is generated in each case for each measurement laser beam. The measurement signals are evaluated, wherein absolute values of velocity components are ascertained as projections of the flow velocity on the respective measurement directions. A solid angle region is ascertained for the prevalent direction of the flow velocity, i.e., a solid angle region that contains the direction of the flow velocity, and signs assigned to this solid angle region are chosen for the individual velocity components. The absolute value of the flow velocity is determined using the ascertained absolute values of the velocity components and using the chosen signs for the velocity components.

According to a second aspect, the invention accordingly relates to an apparatus for determining the absolute value of the flow velocity of a particle-transporting medium. The apparatus comprises an optical emitter device, a detector device and an evaluation device for evaluating the measurement signals. The optical emitter device is embodied to emit at least three measurement laser beams with different measurement directions, of which at least three are non-orthogonal with respect to one another and three are linearly independent. The detector device is embodied to detect the measurement laser beams that have been scattered at particles, and in each case generate a measurement signal for each measurement laser beam. The evaluation device is embodied to ascertain absolute values of velocity components as projections of the flow velocity on the respective measurement directions. Further, the evaluation device ascertains a solid angle region for the prevalent direction of the flow velocity and chooses the signs assigned to this solid angle region for the individual velocity components. The evaluation device further determines the absolute value of the flow velocity using the ascertained absolute values of the velocity components for three linearly independent measurement directions and using the chosen signs for the velocity components.

Advantages of the Invention

The starting point for the present invention is a measurement arrangement comprising at least two, and preferably three, measurement laser beams, the measurement directions of which are linearly independent of one another; however, they are not oriented orthogonal to one another. Such a measurement arrangement can be realized in a substantially more space-saving manner than two or three measurement lasers that are aligned orthogonal to one another. However, the evaluation of the measurement signals of a non-orthogonal measurement laser arrangement requires special measures.

The invention relates to a measurement method in which only the absolute values of velocity components are known along the measurement directions, but not the signs. In this case, it is not generally readily possible to ascertain the absolute value of the flow velocity should the measurement directions not be orthogonal to one another. This can be appreciated on the basis of the mathematical consideration set forth below. In general, the absolute value of the flow velocity $|\vec{v}_{est}|$ for a system with three measurement laser beams is given by the following formula:

$$|\vec{v}_{est}| = \sqrt{\vec{v}_b^T (M^{-1})^T M^{-1} \vec{v}_b} \qquad (1)$$

Here, $\vec{v}_b = (v_1, v_2, v_3)^T$ and $M = (\vec{b}_1\ \vec{b}_2\ \vec{b}_3)^T$, where $\vec{b}_1$, $\vec{b}_2$ and $\vec{b}_3$ denote the normalized measurement directions and $v_1$, $v_2$ and $v_3$ denote the velocity components along the measurement directions. Should the measurement directions each be pairwise orthonormal, it follows that $M^{-1} = M^T$, and the normalization of the measurement directions yields $(M^{-1})^T M^{-1} = \Pi$. In this special case, the absolute value of the flow velocity can consequently be ascertained directly from the absolute values of the velocity components. However, for linearly independent measurement directions that are not pairwise orthogonal, the formula above contains additional mixed terms $v_i v_j$ with $i \neq j$. Therefore, if the signs of the velocity components $v_i$ are unknown, it is not possible to ascertain the absolute value of the flow velocity.

The invention nevertheless renders it possible to correctly detect the absolute value of the flow velocity. A discovery underlying the invention is that the absolute value of the flow velocity can already be determined very well if the prevalent direction of the flow velocity can be assigned to one of eight or four solid angle regions, which together cover the entire surroundings of the measurement arrangement, i.e., the entire measurement surroundings. Thus, the prevalent direction of the flow velocity need not be known accurately in advance. It is sufficient if it can be assigned to one of the solid angle regions. Each of these solid angle regions is represented by a certain signature, i.e., a combination of signs for the individual velocity components. Here, the flow velocity is considered as a vector in a coordinate system which has the measurement arrangement with the measurement lasers disposed at the origin thereof. The alignment of this vector to the origin or away from said origin can be described by an azimuth angle and a zenith angle and can thus be assigned to a solid angle region.

The solid angle region of the prevalent flow velocity can be ascertained by evaluating the measurement signals. As a result, it is possible to ascertain the correct signature $S_n$, which should be understood to mean the specification of the signs of the velocity components. The signature of the vectorial flow velocity consequently denotes, within the meaning of this invention, a triple with entries of 1 or −1, corresponding to the signs of the respective velocity components along the measurement directions. For calculating the absolute value of the flow velocity, a common sign of the velocity components does not play any role since the reversal of the direction of the flow velocity does not influence the calculation. Consequently, the total of eight possible combinations of the signs of the three velocity components can be reduced to four relevant signatures, specifically $S_0 = \mathrm{diag}(1,1,1)$, $S_1 = \mathrm{diag}(1,-1,-1)$, $S_2 = \mathrm{diag}(-1,1,-1)$ and $S_3 = \mathrm{diag}(-1,-1,1)$. The absolute value of the flow velocity is then provided by the following formula:

$$|\vec{v}_{est}| = \sqrt{\vec{v}_b^T S_n^T (M^{-1})^T M^{-1} S_n \vec{v}_b} \qquad (2)$$

In this formula, $\vec{v}_b = (|v_1|, |v_2|, |v_3|)^T$ denotes the vector of the absolute values of the velocity components, in contrast to the formula above.

The invention consequently allows the absolute value of the flow velocity to be ascertained, even without initial knowledge of the prevalent direction of the flow velocity, i.e., without initial knowledge of the signs of the individual velocity components.

According to one variant of the method according to the invention, exactly two measurement laser beams are emitted. The solid angle region for the prevalent direction of the flow velocity is ascertained using the ascertained absolute values of the velocity components. Preferably, the assumption is further made that the vector of the flow velocity lies in a predetermined plane. In particular, the value of the flow velocity can be ascertained under the assumption that the vector of the flow velocity lies in a sensor plane or extends parallel thereto, with the sensor plane being given by virtue of the measurement laser beams being emitted from the plane.

According to a preferred development of the method, at least three measurement laser beams with different measurement directions are emitted, of which at least three are non-orthogonal with respect to one another and three are linearly independent. The value of the flow velocity is determined using the ascertained absolute values of the velocity components for three linearly independent measurement directions and using the chosen signs for the velocity components.

According to a preferred development of the method, the flow velocity with the exception of the sign can also be output in vectorial form, in addition to the absolute value of the flow velocity. To this end, the velocity components provided with the ascertained sign can optionally be converted into an orthogonal coordinate system.

According to a preferred development of the method, the solid angle region for the prevalent direction of the flow velocity is ascertained as one of eight predefined solid angle regions, which together cover the entire measurement surroundings, i.e., the entire surroundings of the measurement arrangement. The eight solid angle regions consequently comprise all possible directions of the flow velocity relative to the measurement arrangement. Respectively two mutually opposing predefined solid angle regions are assigned the same signatures, i.e., signs for the individual velocity components.

Each of the eight solid angle regions corresponds to one of the eight signatures. The signature changes if a projection of the flow velocity on one of the axes of the coordinate system predetermined by the measurement directions changes the sign. This is the case when the angle between the flow velocity and the measurement direction exceeds or drops below a value of 90°, which is the case along a plane. The solid angle regions are consequently delimited by planes and are pyramidal with the tip at the origin.

According to a preferred development of the method, each of the three linearly independent measurement directions are respectively assigned two mutually opposing predefined solid angle regions. The remaining two predefined solid angle regions cover the remaining measurement surroundings. In the case of three measurement directions, the measurement directions are each assigned a signature $S_1$, $S_2$ and $S_3$, respectively. As a result, the two solid angle regions belonging to a signature are also assigned to a measurement direction. The assignment is implemented in such a way that the sign of the velocity component in respect of the respective measurement direction differs from the sign of the velocity components of the two other measurement directions. The remaining signature $S_0$ is not assigned to any of the measurement directions.

According to a preferred development of the method, the at least three absolute values of the velocity components are compared to one another. The maximum absolute value of the velocity components is ascertained. If the difference between the maximum absolute value of the velocity components and the remaining absolute values of the velocity components exceeds a predetermined first limit value, the predetermined solid angle region that is assigned to the measurement direction with the maximum absolute value of the velocity components is determined as solid angle region for the prevalent direction of the flow velocity. This determination of the solid angle regions yields good results for flow velocities with signatures $S_1$, $S_2$ and $S_3$, i.e., if the signs of the velocity components are not all identical. According to one embodiment, the first limit value can be zero.

According to a preferred development of the method, a particle count rate is determined for every measurement direction. The differences between the particle count rates are taken into account when ascertaining the solid angle region for the prevalent direction of the flow velocity. The particle count rate depends on the size of the intersection between the measurement laser beam and the plane in which the vector of the flow velocity of the medium is located. The greater the intersection, the more particles are detected. However, the size of the intersection depends on the angle between the emission direction of the measurement laser beam and the vector of the flow velocity. According to one embodiment, the three emission directions can span a pyramid, particularly a regular pyramid, the tip of which lies in a plane. If the medium now moves with a vectorial flow velocity that is located in this plane or extends parallel to this plane, the intersections are identical. The signature is $S_1$, $S_2$ or $S_3$ in this region. If the angle between the plane and the flow velocity increases, so do the differences between the sizes of the intersections and the signature finally changes to $S_0$. Only for flow velocities in the vicinity of the pole, i.e., only if the flow velocity moves perpendicular toward the plane or away therefrom, do the differences between the sizes of the intersections become smaller once more and finally disappear. Apart from these special cases, which only occur seldom, it is consequently generally possible to distinguish whether the signature equals $S_0$ or whether the signature is not equal to $S_0$, i.e., one of the signatures is $S_1$, $S_2$ or $S_3$, on the basis of the determination of the differences between the sizes of the intersections. By way of example, it is possible to recognize that the signature equals $S_0$ if the differences between the particle count rates exceed a predetermined limit value. If the differences between the particle count rates are smaller than the predetermined limit value, it is recognized that the signature is not equal to $S_0$. The exact ascertainment of the signature can be implemented on the basis of the aforementioned evaluation, explained above, of the absolute values of the velocity components. Alternatively, a fixedly predetermined signature can always be selected even without further evaluation, for example $S_1$ if it was ascertained that the signature is unequal to $S_0$.

According to a preferred development of the method, a mean particle dwell time in the region detected by the corresponding measurement laser beam is determined for each measurement direction. The differences between the mean particle dwell times are taken into account when ascertaining the solid angle region for the prevalent direction of the flow velocity. Essentially, the same as for the particle count rate applies to the particle dwell time as this likewise depends on the size of the above-described intersection.

According to a preferred development of the method, a contrast value of the associated particle count rates and/or of the mean particle dwell times is calculated for each pair of measurement directions. The solid angle region for the prevalent direction of the flow velocity is ascertained as a predefined solid angle region that is assigned to no measurement direction should at least one of the contrast values exceed a predetermined second or third limit value. Here, the second limit value is a limit value assigned to the particle count rate and the third limit value is a limit value assigned to the mean particle dwell times. Consequently, the solid angle region for the prevalent direction of the flow velocity corresponds to the two solid angle regions that correspond to the signature $S_0$. Whether the differences between the particle count rates and/or the particle dwell times are so large that the flow velocity into the solid angle regions points to the signature $S_0$ can be ascertained on the basis of the contrast values.

According to a preferred development of the method, at least four measurement laser beams are emitted in different measurement directions. For at least two different sets of three linearly independent and non-orthogonally aligned measurement directions, a solid angle region for the prevalent direction of the flow velocity and an absolute value of the flow velocity are ascertained as estimates in each case. The prevalent direction of the flow velocity and the absolute value of the flow velocity are determined by a consistency check. The use of at least four measurement laser beams leads to a redundancy, which allows the results to be verified within the scope of the consistency check.

According to a preferred development of the method, the absolute value of the at least one velocity component not belonging to the set is ascertained on the basis of the corresponding measurement signal. A hypothetical absolute value for the at least one velocity component not belonging to the set is determined on the basis of the estimates, ascertained for the set, of the solid angle region for the prevalent direction of the flow velocity and of the absolute value of the flow velocity. The absolute value and the hypothetical absolute value for the at least one velocity component not belonging to the set are compared to one another in order to assess the accuracy of the respective estimates. The hypothetical absolute value of the at least one velocity component not belonging to the set can be ascertained by virtue of the vector of the flow velocity being calculated first, with the entries of the vector being provided by the absolute values of the velocity components provided with the ascertained signs. This vector of the flow velocity is projected on the emission direction belonging to the at least one velocity component not belonging to the set by means of a projection matrix and the absolute value is subsequently calculated. The ascertained value can be maintained, i.e., the consistency check is successful, if the difference between the absolute value and the hypothetical absolute value does not exceed a predetermined limit value.

According to a preferred development of the method, a solid angle region for the prevalent direction of the flow velocity is ascertained in each case for at least three different sets of three linearly independent and non-orthogonally aligned measurement directions. For the purposes of determining the absolute value of the flow velocity, the solid angle region that has been ascertained for the plurality of sets is used for the prevalent direction of the flow velocity. Even if an incorrect solid angle region was ascertained for one set or a plurality of sets, the correct solid angle region is typically nevertheless determined on account of this consistency calculation as a result and the correct signature is determined as a result thereof.

According to a preferred development of the method, the measurement signals are generated by a self-mixing interference between the emitted measurement laser beams and the corresponding scattered measurement laser beams. The absolute values of the velocity components are each determined on the basis of the frequency shift between the emitted measurement laser beam and the corresponding scattered measurement laser beam.

The invention further relates to a use of the method according to the invention for determining a number of particles per unit measurement volume. Here, the measurement laser beams can simply be emitted directly in the surroundings, and so it is possible to dispense with the use of an enclosed measurement volume. Additional elements for generating an air flow, such as ventilators or heating elements, are not required since the naturally occurring air flow already suffices under normal conditions. The measurement volume is determined on the basis of the ascertained absolute value of the flow velocity. Further, it is possible to determine a particulate pollution on the basis of the particle number per unit measurement volume. The US "National Air Quality" standard for particulate matter (PM) introduced a categorization of suspended particles in PMx fractions, which takes account of the size or the diameter x of the dust particles and consequently takes account of the penetration depth of these dust particles into the airways and into the body of an individual. In particular, a distinction is made here between coarse particles PM10, which comprises particles with a diameter of up to 10 µm, fine particles PM2.5 with particles with a diameter of up to 2.5 µm and ultrafine particles PM1 with particles with a diameter of up to 1 µm. On the basis of the PM categorization and known models for the size and mass distribution of dust particles, an estimate value for the particulate pollution in the units of dust particle mass per volume can be ascertained on the basis of the number of particles per unit measurement volume.

According to a preferred development of the apparatus the optical emitter device comprises at least three laser diodes, particularly VCSELs. The detector device comprises at least one photodiode for each of the three laser diodes, in particular a photodiode integrated into the laser diode in each case.

According to a preferred development of the apparatus, the evaluation device is embodied to respectively determine the absolute values of the velocity components on the basis of the frequency shift, ascertained by beam interference, between the emitted measurement laser beam and the corresponding scattered measurement laser beam.

According to a preferred development of the apparatus, the evaluation device is further embodied to determine a particle count rate and/or a mean particle dwell time for each measurement direction.

According to a preferred development of the apparatus, the latter comprises a first memory device for storing measurement events and measurement quantities, wherein the detection of a particle is referred to as a measurement event and, in particular, the occurring measurement direction, velocity components, count rates and/or dwell times are stored as measurement quantities.

According to a preferred development of the apparatus, the latter comprises at least one further memory device, in which is stored at least one first limit value for the difference between the maximum velocity component and the remaining velocity components and/or at least one second limit value for the contrast value of the particle count rates and/or at least one third limit value for the contrast value of the particle dwell times.

The invention can advantageously be used within the scope of an apparatus for determining a particle number per unit measurement volume, to be precise for determining the measurement volume on the basis of the ascertained absolute value of the flow velocity.

BRIEF DESCRIPTION OF THE DRAWINGS

In detail.

Equivalent or functionally equivalent elements and apparatuses are denoted by the same reference signs in all figures.

DESCRIPTION OF THE EXEMPLARY EMBODIMENTS

Figure 1:
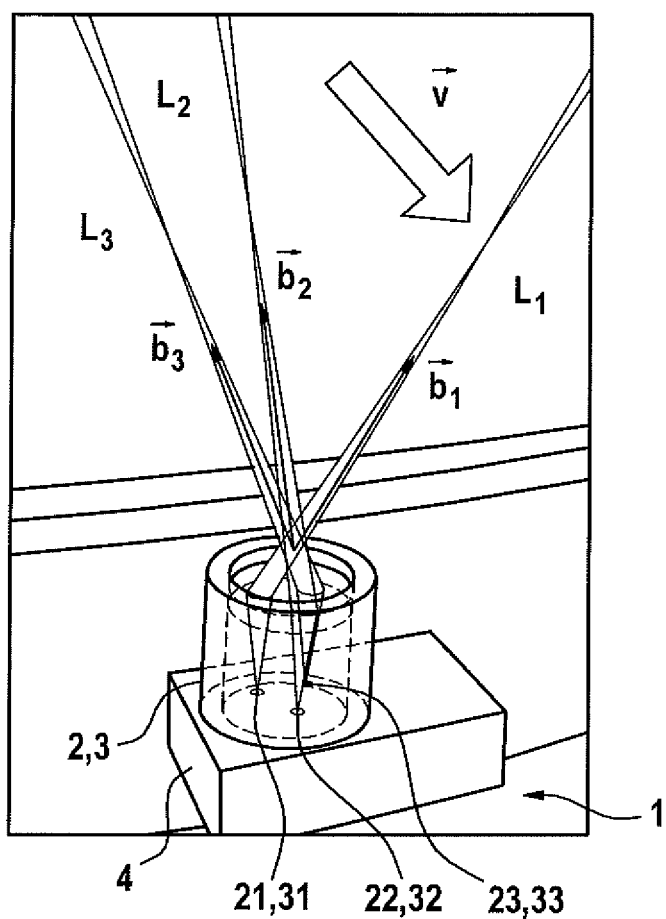
FIG. 1 shows a schematic oblique view of an apparatus for determining the absolute value of the flow velocity of a medium according to one embodiment of the invention.

FIG. 1 shows a schematic oblique view of an apparatus 1 for determining the absolute value of the flow velocity v of a particle-transporting medium 5. The flow velocity v should be understood to mean the velocity relative to the apparatus 1. To this end, the apparatus 1 can be situated in the medium 5; however, the apparatus 1 can also be spaced apart from the medium 5, wherein the medium 5 may be, for instance, ambient air with particles, a gas with particles flowing past the apparatus 1 or a liquid with particles flowing past the apparatus 1.

The apparatus 1 comprises an optical emitter device 2 with three laser diodes 21, 22, 23, which are embodied as VCSELs and which emit measurement laser beams $L_i$, i=1, 2, 3 perpendicular to a sensor plane that is set by a substrate of the apparatus 1. A lens or any other optical system steers the measurement laser beams $L_1, L_2, L_3$ in three measurement directions $b_1, b_2, b_3$. The measurement directions $b_i$ of the measurement laser beams $L_i$ differ and are linearly independent of one another. Further, the measurement directions $b_i$ are pairwise non-orthogonal and preferably include acute angles in pairwise fashion, as a result of which a compact structure of the apparatus 1 can be achieved. In particular, use can be made of space-saving optical elements and individual optical units for each individual measurement laser beam $L_i$ may be economized where appropriate by using common optical units.

The apparatus 1 further comprises a detector device 3 with three photodiodes 31, 32, 33, which are integrated into the laser diodes 21, 22, 23 and which detect the measurement laser beams $L_i$ that are scattered at particles. The detector device 3 generates an associated measurement signal $m_i$ for each measurement laser beam $L_i$. Preferably, as shown in FIG. 1, the optical emitter device 2 comprises a number of laser diodes that correspond to the measurement laser beams $L_i$, said laser diodes preferably possibly being VCSELs. The light emitted by the laser diodes can be aligned in the respective measurement directions b_i by means of optical elements such as lenses, prisms or mirrors. However, it is also possible for the number of laser diodes to be smaller than the number of measurement laser beams $L_i$ if the measurement laser beams $L_i$ are generated by way of splitting the beam of the emitted laser beams.

As shown in FIG. 1, the detector device 3 preferably comprises a number of photodiodes corresponding to the laser diodes, wherein the photodiodes can preferably each be integrated into a laser diode. In this case, each photodiode respectively detects the result of the interference of the generated measurement laser beam $L_i$ with the measurement laser beam $L_i$ that has been scattered at particles in the medium, with frequency shifts arising in the process. The detector device 3 measures the size of the frequency shift, which depends on the absolute value of the velocity component $v_i$ of the particles in the measurement direction b_i, i.e., in the direction of the measurement laser beam $L_i$. Consequently, the detector device 3 can determine the associated absolute value of the velocity component $v_i$ on the basis of the frequency shift for each measurement direction b_i and can output said absolute value as a measurement signal $m_i$. In the context of the invention, a velocity component $v_i$ should be understood to mean the projection of the flow velocity v on the respective measurement direction b_i.

Three linearly independent measurement directions form an oblique coordinate system, wherein the flow velocity v can be considered to be a vector that points away from the origin of this coordinate system. Each of the measurement directions divides the space into two half-spaces by means of a plane that passes through the origin and that is perpendicular to the measurement direction, specifically into a positive half-space, in which vectors of the flow velocity v have a positive velocity component $v_i$, and into a negative half-space, in which vectors of the flow velocity v have a negative velocity component $v_i$. The planes that separate the half-spaces from one another intersect for the various measurement directions, and so a total of 2·2·2=8 solid angle regions arise. For orthogonal measurement directions, i.e., Cartesian coordinate systems, these solid angle regions would precisely correspond to the octants known from the geometry.

Consequently, one of the possible combinations of signs of the velocity components $v_i$, which is referred to as signature, corresponds to each solid angle region. As described above, signatures that only differ by a common sign should be considered to be equivalent for the calculation of the absolute value of the flow velocity v.

An evaluation device 4 of the apparatus 1 is embodied to ascertain the solid angle region into which the vector of the flow velocity v points, i.e., a solid angle region corresponding to the prevalent direction of the flow velocity v. To this end, the evaluation device 4 can compare the absolute values of the velocity components $v_i$ with one another and/or take account of a particle count rate $cr_i$ and/or a mean particle dwell time $dt_i$ in relation to the respective measurement directions. These evaluation methods are explained in more detail below with reference to FIGS. 5 to 13.

The evaluation device 4 now chooses the signs for the velocity components $v_i$ that are assigned to the ascertained solid angle range. Consequently, both the absolute values of the velocity components $v_i$ and the signs of the velocity components $v_i$ are known; i.e., the evaluation device 4 ascertains the velocity components $v_i$ themselves. The evaluation device 4 can calculate the value of the flow velocity v by means of Formula (2) specified above, wherein the velocity components $v_i$ can be converted into an orthogonal system by means of the matrix M that is predetermined by the measurement directions. According to further embodiments, the evaluation device 4 can also calculate the flow velocity v itself in addition to the absolute value of the flow velocity v; i.e., said evaluation device can calculate the vectorial form apart from the sign. If the flow velocity v should be specified in an orthogonal coordinate system, then the velocity components $v_i$, which are already known relative to the measurement directions, can be converted into the orthogonal coordinate system with the aid of the matrix M. Consequently, the evaluation device 4 can be embodied to also determine the flow velocity v itself, apart from the sign, in addition to the absolute value of the flow velocity v.

Figure 2:
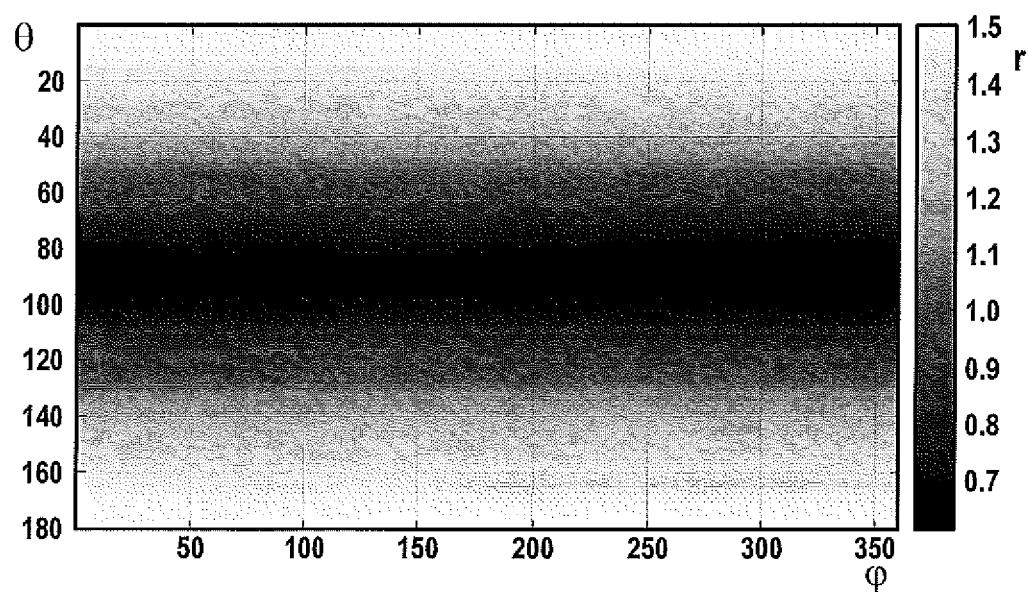
FIG. 2 shows an illustration of the dependence of the error of the velocity determination as a function of a zenith angle and an azimuth angle of the flow velocity under an assumption of orthogonality.

FIG. 2 shows, as a function of a zenith angle θ measured in relation to the sensor plane and an azimuth angle φ of the flow velocity v, the dependence of the error of the velocity determination if the non-orthogonality of the measurement directions is simply neglected during the calculation; i.e., if the mixed terms $v_i v_j$ with the unknown signs, occurring in Formula (1), are set to 0. Plotted is the ratio r of the calculated flow velocity v to the actual flow velocity v.

Figure 3:
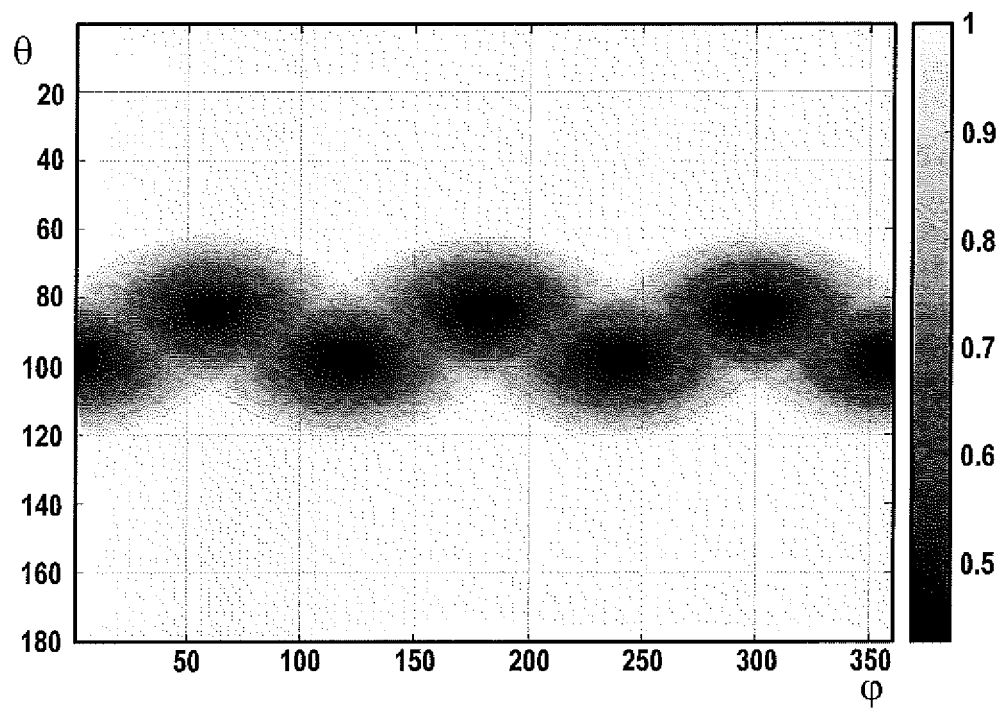
FIG. 3 shows an illustration of the dependence of the error of the velocity determination as a function of the zenith angle and the azimuth angle of the flow velocity if the signs of the velocity components are not taken into account.

FIG. 3 shows, as a function of the zenith angle and the azimuth angle of the flow velocity v, the dependence of the error of the velocity determination if the correct signs of the occurring mixed terms $v_i v_j$ are not taken into account in the calculation according to Formula (1), for example if all are set to 1 or +.

As may be gathered from FIGS. 2 and 3, significant errors may occur during the calculation; this is why the signs and/or the relative signs, i.e., the signature, are likewise ascertained according to the invention. Relative signs should be understood to mean that the product of the signs of the velocity components $v_i$ is assigned to each pair of velocity components $v_i$ as a relative sign. Expressed differently, all that matters is the difference between the signs while an absolute sign is irrelevant on account of the symmetry when calculating the value of the flow velocity.

Figure 4:
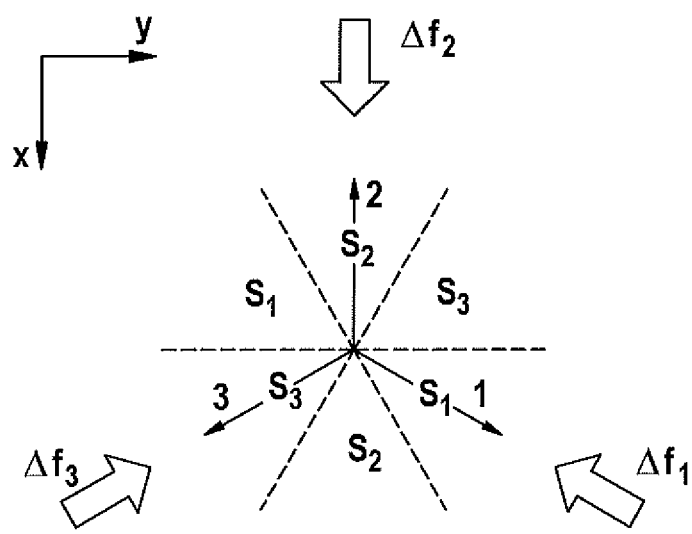
FIG. 4 shows an illustration of the dependence of the signature on the frequency shifts for flow velocities in the plane.

FIG. 4 shows the dependence of the signature on the frequency shifts for flow velocities v lying in a xy-plane that extends parallel to the sensor plane. The planes that separate the half-spaces from one another are straight lines in this two-dimensional case, said straight lines separating six angle regions from one another that correspond to the solid angle regions to which the signatures $S_1$, $S_2$ and $S_3$ are assigned. The maximum frequency shift $\Delta f_i$ corresponds to a maximum absolute value of the velocity components $v_i$. Now, for example, should the frequency shift $\Delta f_1$ be at a maximum in respect of a first measurement direction $b_1$, i.e., should said frequency shift be greater than the frequency shifts in the two other measurement directions, or should, equivalently, the absolute value of the velocity components $v_i$ be at a maximum in respect of the first measurement direction $b_1$, then this means that the angle between the flow velocity v and the first measurement direction $b_1$ is smaller than the angles between the flow velocity v and the two other measurement directions. For a symmetrical arrangement of three measurement directions, i.e., if the angles between respectively two measurement directions all have the same size, this is tantamount to the flow velocity v pointing into an angle region which is assigned the signature $S_1$. Preferably, the measurement directions are consequently symmetrical with respect to one another. In the case of a non-symmetrical arrangement, the boundaries of the solid angle regions are displaced accordingly.

Then, the evaluation device 4 can be embodied to ascertain the velocity component $v_{i(max)}$ that has the largest absolute value. Then, the evaluation device 4 chooses the solid angle region of the associated measurement direction and chooses the signature assigned to the solid angle region, i.e., chooses the combination of signs of the velocity components $v_i$ assigned to the solid angle region.

Figure 5:
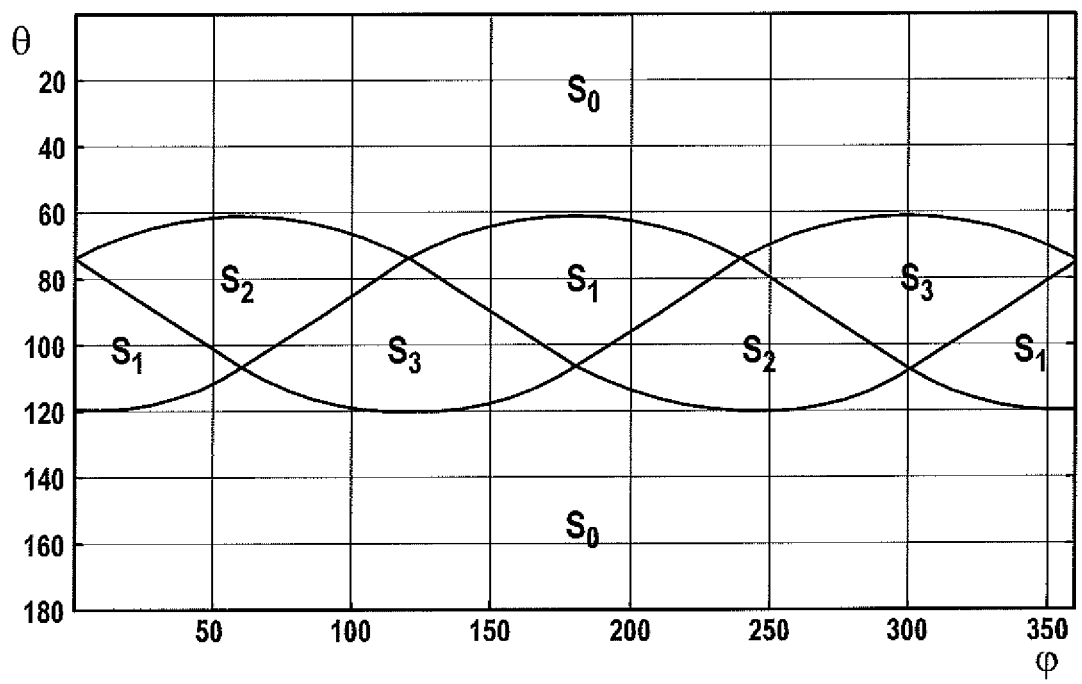
FIG. 5 shows an illustration of the dependence of the signature on the zenith angle and the azimuth angle of the flow velocity.

FIG. 5 shows the dependence of the signature on the zenith angle and the azimuth angle of the flow velocity v. As may be seen, the signature equals $S_0$ for zenith angles in the vicinity of the poles. The reason for this is that the flow velocity v in this case is always located in the positive half-space or always located in the negative half-space, i.e., it substantially always points in the same direction as the measurement directions or always points in the opposite direction to the measurement directions.

Figure 6:
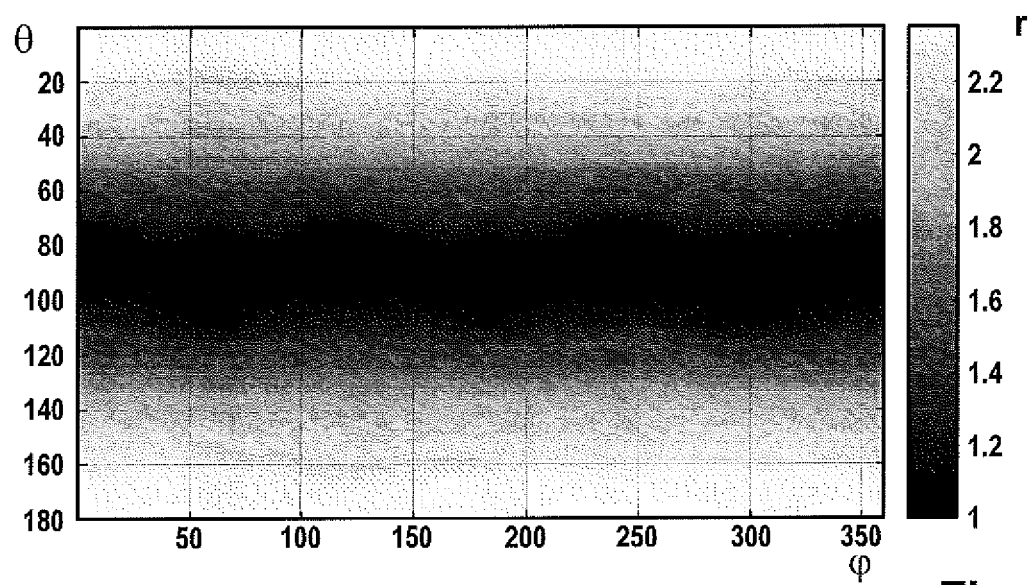
FIG. 6 shows an illustration of the dependence of the error of the velocity determination as a function of the zenith angle and the azimuth angle of the flow velocity when determining the signs on the basis of the absolute values of the velocity components.

FIG. 6 shows the error of the velocity determination as a function of the zenith angle and the azimuth angle of the flow velocity v, wherein the signs are ascertained according to the method, just described above, on the basis of the absolute values of the velocity components $v_i$. The method supplies very good values for flow velocities v that are substantially parallel to the sensor plane. For angles that are more pronounced, the error is greater since the signature $S_0$ is not identified by the above-described method.

Therefore, the evaluation device 4 can be alternatively or additionally embodied to determine the signature on the basis of a particle count rate $cr_i$ of the particles in the measurement laser beam or on the basis of a mean particle dwell time $dt_i$ of the particles in the measurement laser beam. Should a contrast value of the particle count rate $cr_i$ or a contrast value of the particle dwell time $dt_i$ exceed a respective predetermined second or third limit value for a pair of measurement directions, the evaluation device 4 can recognize that the signature equal to $S_0$ must be selected. Otherwise, the evaluation device 4 can select any signature $S_1$, $S_2$ or $S_3$. By way of example, it is possible to always select the signature $S_1$.

The contrast rate within the scope of the determination on the basis of the particle count rate $cr_i$ depends on the particle density since the latter influences the particle count rate $cr_i$. The decision as to whether the particle count rates $cr_i$ differ significantly (for instance, at a 95% confidence level) can be implemented by means of hypothesis testing on the basis of the underlying Poisson distribution for each measurement direction. The time duration of the measurement of the particle count rates $cr_i$ may therefore depend on the particle density and may be chosen to be longer with lower particle density. Such a dependence on the particle density does not exist for the particle dwell time $dt_i$, and so the latter can be used for determining the signature, particularly in the case of lower densities.

Figure 7:
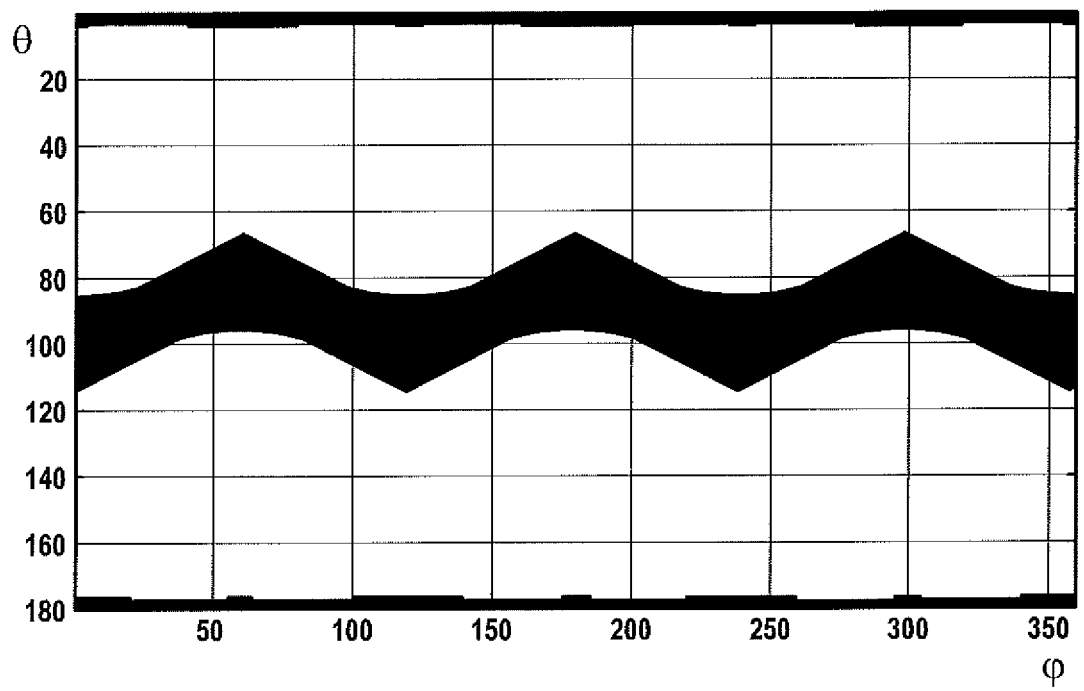
FIG. 7 shows an illustration of the selection of the signature $S_0$ as a function of the zenith angle and the azimuth angle of the flow velocity when determining the signs on the basis of the particle count rate using a limit value.

FIG. 7 shows the selection of the signature $S_0$ as a function of the zenith angle and the azimuth angle of the flow velocity v on the basis of a contrast value of the particle count rates $cr_i$ using the second limit value.

Figure 8:
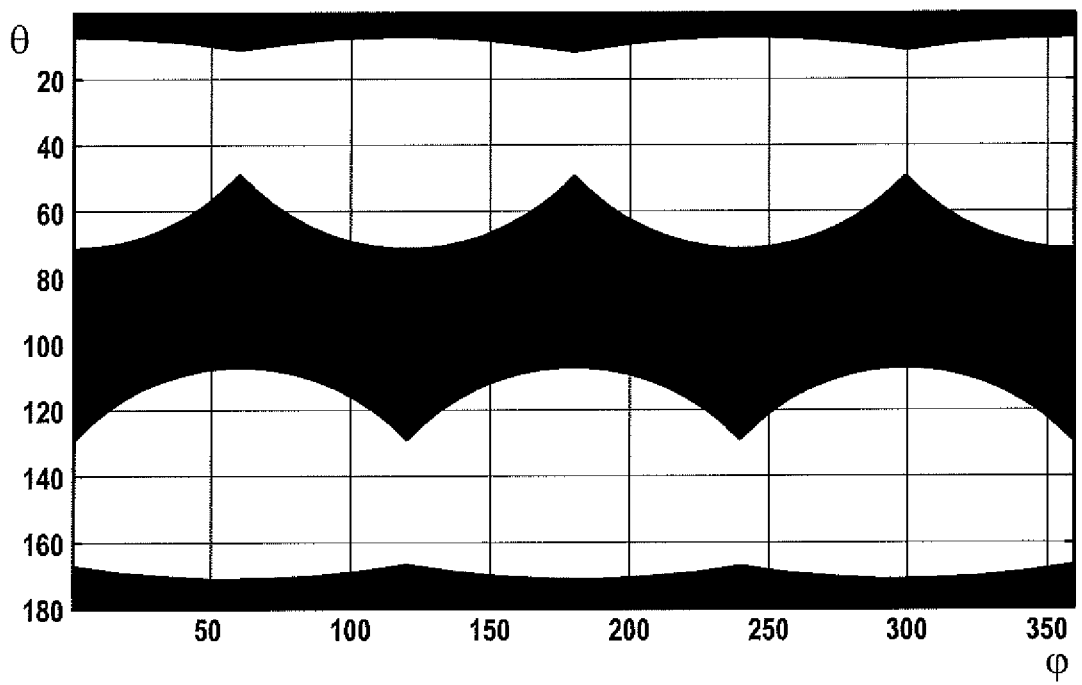
FIG. 8 shows an illustration of the selection of the signature $S_0$ as a function of the zenith angle and the azimuth angle of the flow velocity when determining the signs on the basis of the particle count rate using a further limit value.

FIG. 8 differs from FIG. 7 in that a higher value was chosen as a second limit value.

Figure 9:
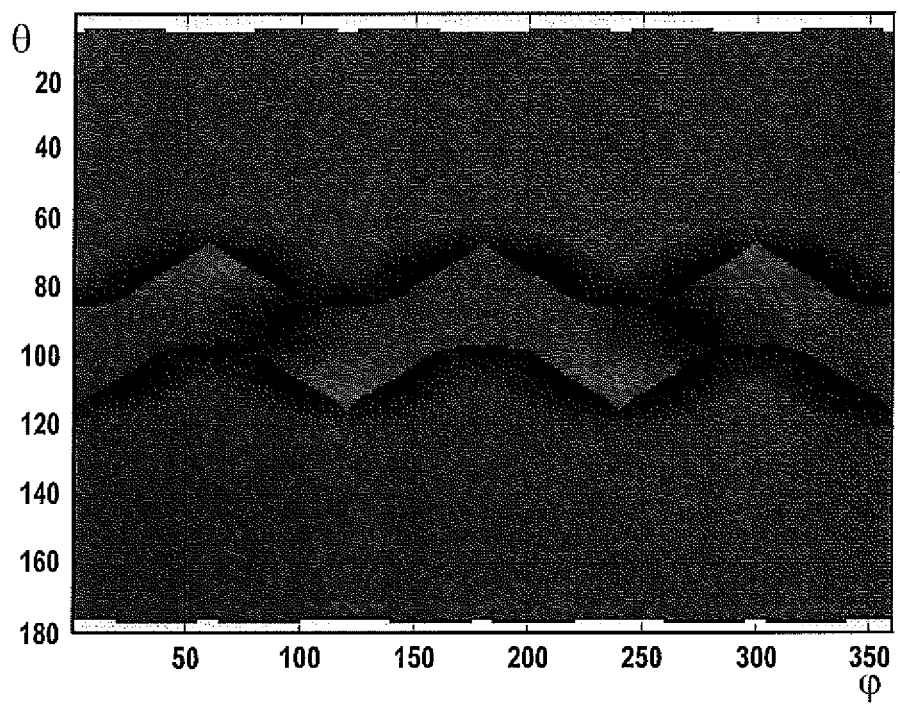
FIG. 9 shows an illustration of the dependence of the error of the velocity determination as a function of the zenith angle and the azimuth angle of the flow velocity when determining the signs on the basis of the particle count rate using a limit value.

FIG. 9 shows, as a function of the zenith angle and of the azimuth angle of the flow velocity, the dependence of the error of the velocity determination. Plotted is the ratio of the calculated absolute value of the flow velocity v to the actual absolute value of the flow velocity v. Here, the second limit value was chosen like in FIG. 7.

Figure 10:
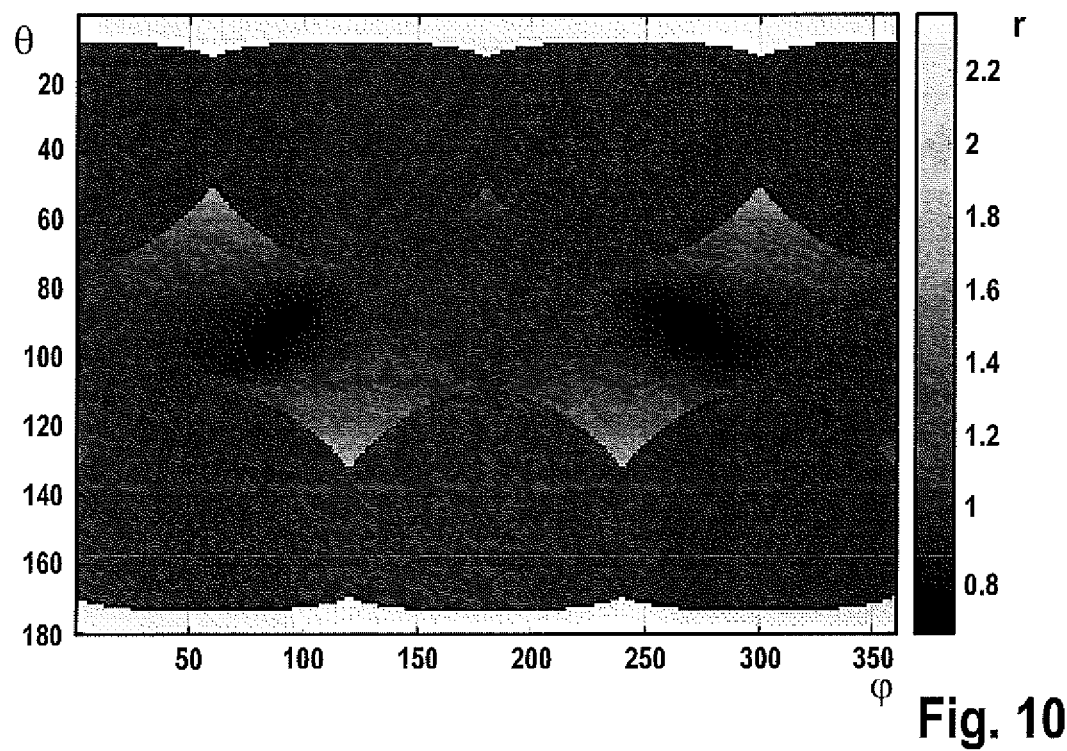
FIG. 10 shows an illustration of the dependence of the error of the velocity determination as a function of the zenith angle and the azimuth angle of the flow velocity when determining the signs on the basis of the particle count rate using a further limit value.

FIG. 10 shows, as a function of the zenith angle and of the azimuth angle of the flow velocity v, the dependence of the error of the velocity determination. Here, the second limit value was chosen like in FIG. 8.

Further, a combination of the methods is possible. Thus, whether the signature equals $S_0$ can be initially ascertained on the basis of a contrast value of the particle count rate $cr_i$ and/or on the basis of a contrast value of the particle dwell time $dt_i$. If this is not the case, the evaluation device 4 can ascertain the signature $S_1$, $S_2$ or $S_3$, as described above, on the basis of determining the maximum velocity component $v_i$.

Further, provision can also be made for the signature to be chosen to equal $S_0$, even as soon as this is yielded by only one of the determinations on the basis of the particle count rate $cr_i$ and on the basis of the particle dwell time $dt_i$. Only if both determinations on the basis of the contrast values yield that the signature is not equal to $S_0$ does the evaluation device 4 ascertain the signature $S_1$, $S_2$ or $S_3$ on the basis of determining the maximum velocity component $v_i$.

Figure 11:
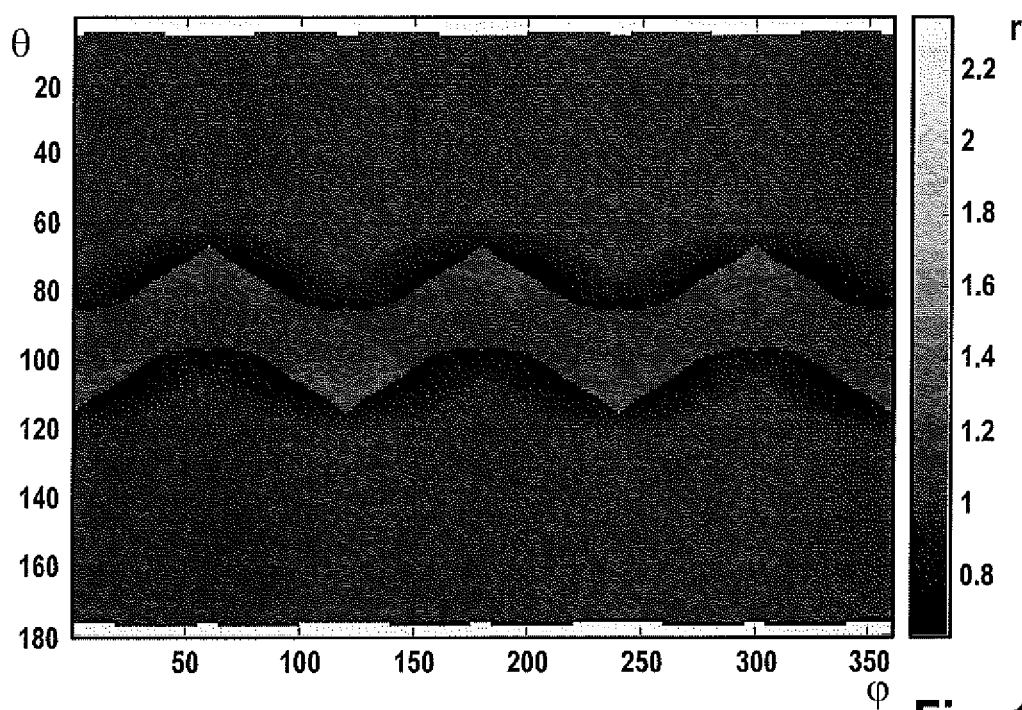
FIG. 11 shows an illustration of the dependence of the error of the velocity determination as a function of the zenith angle and the azimuth angle of the flow velocity when determining the signs on the basis of the absolute values of the velocity components and on the basis of the particle count rate using a limit value.

FIG. 11 shows the dependence of the error of the velocity determination on the zenith angle and on the azimuth angle of the flow velocity v in such a combined method. Here, the second limit value was chosen like in FIG. 7.

Figure 12:
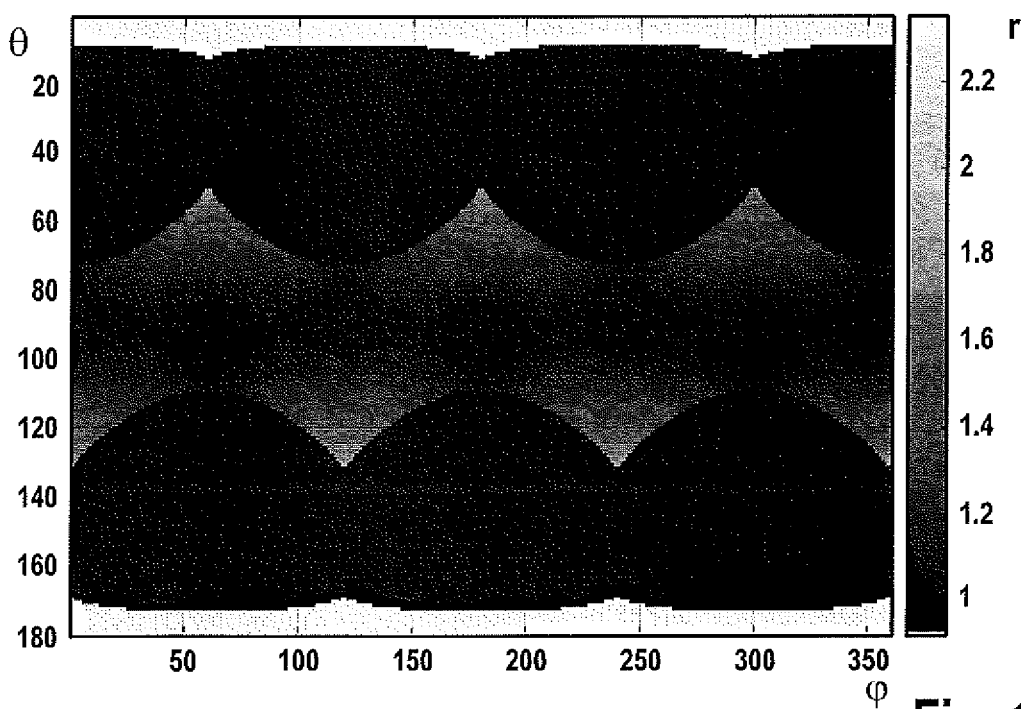
FIG. 12 shows an illustration of the dependence of the error of the velocity determination as a function of the zenith angle and the azimuth angle of the flow velocity when determining the signs on the basis of the absolute values of the velocity components and on the basis of the particle count rate using a further limit value.

FIG. 12 shows the dependence of the error of the velocity determination on the zenith angle and on the azimuth angle of the flow velocity v in such a combined method. Here, the second limit value was chosen like in FIG. 8.

Furthermore, it is possible to emit more than three measurement laser beams $L_j$. The redundancy occurring in this case can help with improving the measurement results, for instance by virtue of at least one of the above-described consistency checks being carried out by means of the evaluation device 4. In particular, provision can be made of a fourth measurement laser beam $L_4$, which is perpendicular to the sensor plane, for example.

Figure 13:
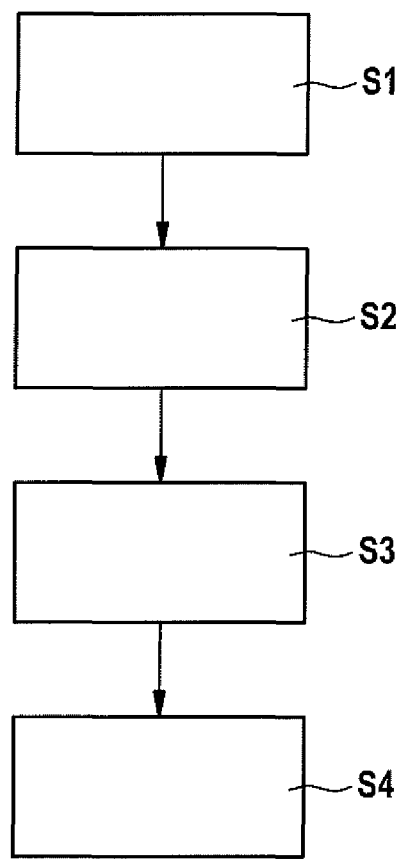
FIG. 13 shows a flowchart for explaining a method for determining the absolute value of the flow velocity of a medium according to one embodiment of the invention.

FIG. 13 shows a flowchart of a method for determining the absolute value of the flow velocity v of a medium according to one embodiment of the invention.

In a first step S1, at least two measurement laser beams $L_i$, preferably at least three measurement laser beams $L_i$, are emitted in linearly independent measurement directions b_i, which are not orthogonal to one another.

In a second step S2, the measurement laser beams $L_i$ scattered at particles are detected. A measurement signal $m_i$ is generated for each measurement laser beam $L_i$. The measurement signals $m_i$ are evaluated. By way of example, the measurement signals $m_i$ can comprise frequency shifts in the case of an interference between the emitted measurement laser beams $L_i$ and the scattered measurement laser beams $L_i$.

In a third step S3, the measurement signals $m_i$ are evaluated, wherein, on the basis of the frequency shifts, the absolute values of velocity components $v_i$ are ascertained as projection of the flow velocity v on the respective measurement direction b_i. Further, a solid angle region, in which the prevalent direction of the flow velocity v is located, is ascertained. This solid angle region is selected from a number of predetermined solid angle regions which, together, cover the entire measurement surroundings of the measurement arrangement. A signature is assigned to each of these predetermined solid angle regions, and so signs can be assigned to the respective absolute values of the velocity components $v_i$ by way of ascertaining the solid angle region in which the prevalent direction of the flow velocity is located. Consequently, it is then also possible to determine the absolute value of the flow velocity v.

According to further embodiments, provision can be made for at least four measurement laser beams $L_i$ to be emitted. Respectively one absolute value of the flow velocity v is calculated as an estimate according to the method described for different sets of three measurement directions in each case, said measurement directions being linearly independent and non-orthogonal. The estimated absolute values of the flow velocity v are compared to one another and a final value for the absolute value of the flow velocity v is ascertained within the scope of a consistency check.

By way of example, the sign combination can be ascertained for one of the sets such that the flow velocity v is calculated in vectorial form using the absolute values of the velocity components $v_i$. Then, the flow velocity v is projected on a measurement direction that is not part of the set and the absolute value is formed so as to determine a hypothetical absolute value of the velocity component $v_i$ for this measurement direction. This value is compared to the absolute value of the velocity component $v_i$ determined on the basis of the interference measurements. If the deviation is below a predetermined threshold value, the calculation of the signs is assessed as being correct and the absolute value of the flow velocity v determined on the basis of the set is output. Additionally, the flow velocity v itself can be output in vectorial form.

The absolute value of the flow velocity v can also be calculated for at least three different sets of measurement directions. The sign combination occurring most frequently in these calculations or the solid angle region occurring most frequently is used to calculate the absolute value of the flow velocity v.

The invention claimed is:

1. A method for determining the absolute value of the flow velocity of a particle-transporting medium, comprising the steps of:

emitting at least two measurement laser beams with linearly independent, non-orthogonal measurement directions;

detecting the measurement laser beams scattered at particles and generating one measurement signal in each case for each measurement laser beam; and evaluating the measurement signals, a. wherein absolute values of velocity components are ascertained as projections of the flow velocity on the respective measurement directions;

b. wherein a solid angle region is ascertained for the prevalent direction of the flow velocity and signs assigned to this solid angle region are chosen for the individual velocity components; and c. wherein the absolute value of the flow velocity is determined using the ascertained absolute values of the velocity components and using the chosen signs for the velocity components.

2. The method according to claim 1, characterized in that at least three measurement laser beams with different measurement directions are emitted, of which at least three are non-orthogonal with respect to one another and three are linearly independent; and in that the value of the flow velocity is determined using the ascertained absolute values of the velocity components for three linearly independent measurement directions and using the chosen signs for the velocity components.

3. The method according to claim 2, characterized in that each of the three linearly independent measurement directions is respectively assigned two mutually opposing predefined solid angle regions and in that the remaining two predefined solid angle regions cover the remaining measurement surroundings.

4. The method according to claim 3, characterized a. in that the at least three absolute values of the velocity components are compared to one another, b. in that the maximum absolute value of the velocity components is ascertained and c. in that, if the difference between the maximum absolute value of the velocity components and the remaining absolute values of the velocity components exceeds a predetermined first limit value, the predetermined solid angle region that is assigned to the measurement direction with the maximum absolute value of the velocity components is determined as solid angle region for the prevalent direction of the flow velocity.

5. The method according to claim 1, characterized in that the ascertained absolute values of the velocity components are transformed into an orthogonal coordinate system using the ascertained signs for the velocity components and the flow velocity of the particle stream is calculated in the orthogonal coordinate system, at least apart from the sign thereof.

6. The method according to claim 1, characterized in that the solid angle region for the prevalent direction of the flow velocity is ascertained as one of eight predefined solid angle regions, which together cover the entire measurement surroundings, and in that respectively two predefined solid angle regions lying opposite one another are assigned the same signs for the individual velocity components.

7. The method according to claim 6, characterized in that:

at least one of a contrast value of the associated particle count rates and the mean particle dwell times is calculated for each pair of measurement directions, and the solid angle region for the prevalent direction of the flow velocity is ascertained as a predefined solid angle region that is assigned to no measurement direction if at least one of the contrast values exceeds a predetermined second or third limit value.

8. The method according to claim 1, characterized in that a particle count rate is determined for every measurement direction and in that the differences between the particle count rates are taken into account when ascertaining the solid angle region for the prevalent direction of the flow velocity.

9. The method according to claim 8, characterized in that:
at least one of a contrast value of the associated particle count rates and the mean particle dwell times is calculated for each pair of measurement directions, and
the solid angle region for the prevalent direction of the flow velocity is ascertained as a predefined solid angle region that is assigned to no measurement direction if at least one of the contrast values exceeds a predetermined second or third limit value.

10. The method according to claim 1, characterized in that a mean particle dwell time in the region detected by the corresponding measurement laser beam is determined for each measurement direction and in that the differences between the mean particle dwell times are taken into account when ascertaining the solid angle region for the prevalent direction of the flow velocity.

11. The method according to claim 1, wherein at least four measurement laser beams are emitted in different measurement directions, characterized in that, for at least two different sets of three linearly independent and non-orthogonally aligned measurement directions, a solid angle region for the prevalent direction of the flow velocity and an absolute value of the flow velocity are ascertained as estimates in each case and in that the prevalent direction of the flow velocity and the absolute value of the flow velocity are then determined by a consistency check.

12. The method according to claim 11, characterized
in that the absolute value of the at least one velocity component not belonging to the set is ascertained on the basis of the corresponding measurement signal,
in that a hypothetical absolute value for the at least one velocity component not belonging to the set is determined on the basis of the estimates, ascertained for the set, of the solid angle region for the prevalent direction of the flow velocity and of the absolute value of the flow velocity, and
in that the absolute value and the hypothetical absolute value for the at least one velocity component not belonging to the set are compared to one another in order to assess the accuracy of the respective estimates.

13. The method according to claim 11, wherein a solid angle region for the prevalent direction of the flow velocity is ascertained in each case for at least three different sets of three linearly independent and non-orthogonally aligned measurement directions, characterized in that, for the purposes of determining the absolute value of the flow velocity, the solid angle region that has been ascertained for the plurality of sets is used for the prevalent direction of the flow velocity.

14. The method according to claim 1, characterized in that the measurement signals are generated by self-mixing interference between the emitted measurement laser beams and the corresponding scattered measurement laser beams and in that the absolute values of the velocity components are each determined on the basis of the frequency shift between the emitted measurement laser beam and the corresponding scattered measurement laser beam.

15. Use of the method according to claim 1 for determining a particle number per unit measurement volume, wherein the measurement volume is determined on the basis of the ascertained absolute value of the flow velocity.

16. An apparatus for determining the absolute value of the flow velocity of a particle-transporting medium, comprising:
an optical emitter device configured to emit at least three measurement laser beams with different measurement directions, of which at least three are non-orthogonal with respect to one another and three are linearly independent;
a detector device configured to detect the measurement laser beams that have been scattered at particles, and to in each case generate a measurement signal for each measurement laser beam; and
an evaluation device for evaluating the measurement signals, said evaluation device being configured
a. to ascertain absolute values of velocity components as projections of the flow velocity on the respective measurement directions;
b. to ascertain a solid angle region for the prevalent direction of the flow velocity and choose signs assigned to this solid angle region for the individual velocity components; and
c. to determine the absolute value of the flow velocity using the ascertained absolute values of the velocity components for three linearly independent measurement directions and using the chosen signs for the velocity components.

17. The apparatus according to claim 16, characterized in that the optical emitter device comprises at least three laser diodes and in that the detector device comprises at least one photodiode for each of the three laser diodes integrated into the laser diode.

18. The apparatus according to claim 17, characterized in that the evaluation device is configured to determine the absolute values of the velocity components-on the basis of the frequency shift, ascertained by beam interference, between the emitted measurement laser beam and the corresponding scattered measurement laser beam.

19. The apparatus according to claim 16, characterized in that the evaluation device is further configured to determine one or more of a particle count rate and a mean particle dwell time for each measurement direction.

20. The apparatus according to claim 16 further comprising a first memory device for storing measurement events and measurement quantities, wherein the detection of a particle is referred to as a measurement event and one or more of the occurring measurement direction, velocity components, count rates and dwell times are stored as measurement quantities.

21. The apparatus according to claim 20, further comprising at least one further memory device, in which is stored one or more of at least one first limit value for the difference between the maximum velocity component and the remaining velocity components, and at least one second limit value for the contrast value of the particle count rates, and at least one third limit value for the contrast value of the particle dwell times.

22. The apparatus according to claim 16, wherein the evaluation device is further configured to determine the measurement volume on the basis of the ascertained absolute value of the flow velocity.

* * * * *